Dec. 9, 1924.

H. R. SACK 1,518,276

WHEEL FOR DEMOUNTABLE RIMS

Filed May 26, 1923

4 Sheets-Sheet 1

Witnesses:

Inventor

Herman R. Sack

By Joshua R. H. Potts his Attorney

Dec. 9, 1924.

H. R. SACK 1,518,276

WHEEL FOR DEMOUNTABLE RIMS

Filed May 26, 1923    4 Sheets-Sheet 2

Witnesses:
George A. Gruss

Inventor
Herman R. Sack
By Joshua R. H. Potts
his Attorney

Dec. 9, 1924.

H. R. SACK

WHEEL FOR DEMOUNTABLE RIMS

Filed May 26, 1923

1,518,276

4 Sheets-Sheet 3

Witnesses:

Inventor
Herman R. Sack
By Joshua R. H. Potts
his Attorney

Dec. 9, 1924.　　　　　　　　　　　　　　1,518,276
H. R. SACK
WHEEL FOR DEMOUNTABLE RIMS
Filed May 26, 1923　　　　4 Sheets-Sheet 4
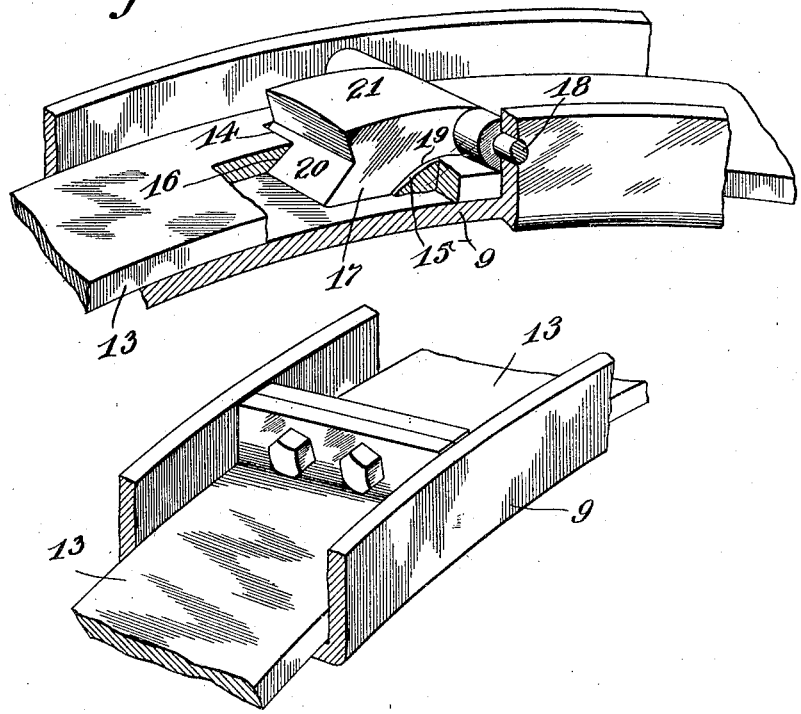
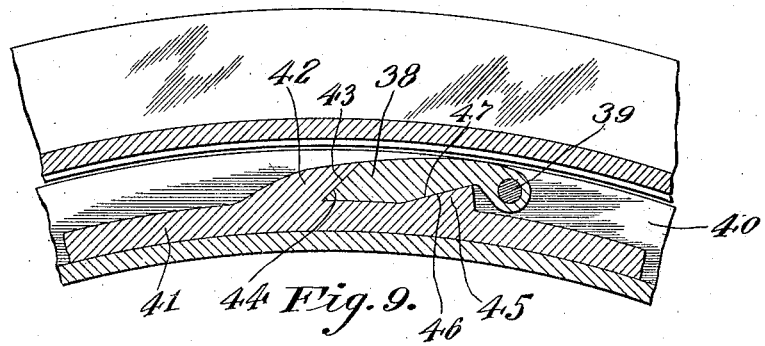
Inventor
Herman R. Sack
By Joshua R. H. Potts
his Attorney Patented Dec. 9, 1924.

1,518,276

UNITED STATES PATENT OFFICE.

HERMAN RUDOLPH SACK, OF WALLINGFORD, PENNSYLVANIA.

WHEEL FOR DEMOUNTABLE RIMS.

Application filed May 26, 1923. Serial No. 641,587.

*To all whom it may concern:*

Be it known that I, HERMAN RUDOLPH SACK, a citizen of the United States, residing at Wallingford, in the county of Delaware and State of Pennsylvania, have invented certain new and useful Improvements in Wheels for Demountable Rims, of which the following is a specification.

My invention relates to wheels for demountable rims and its objects are to provide a wheel from which the demountable rim may be released by turning a single member; means on the wheel for securing the rim thereto which will centralize the rim relatively to the axis of the wheel, and means for securing the rim to the wheel without turning the rim relatively to the wheel.

These objects, and other advantageous ends which will be described hereinafter, I attain in the following manner, reference being had to the accompanying drawings in which—

Figure 1:
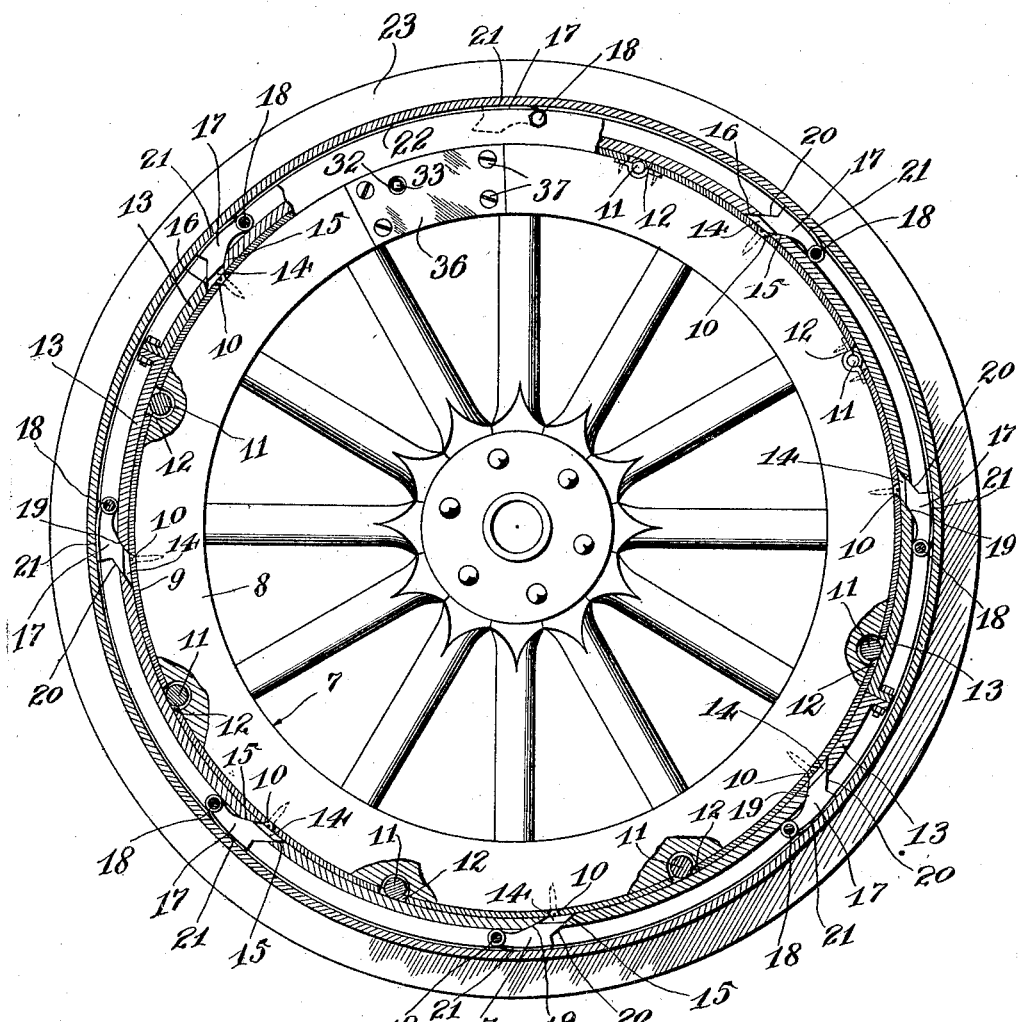
Figure 2:
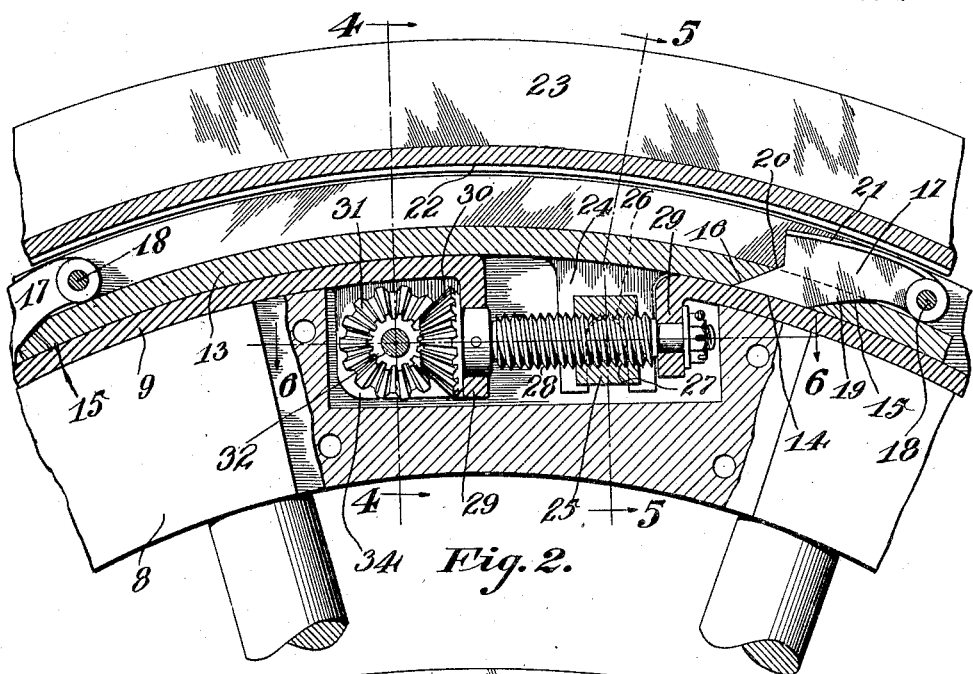
Figure 3:
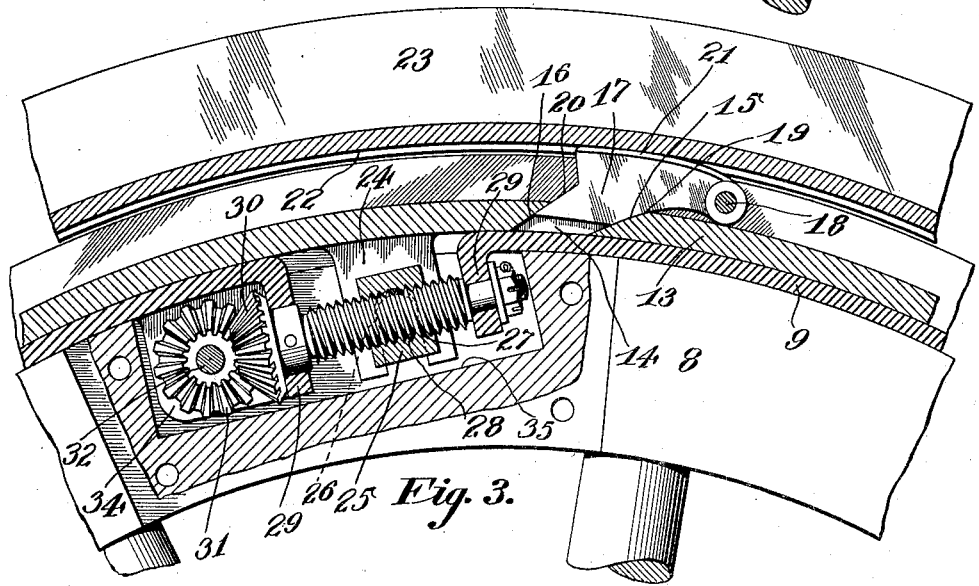
Figure 4:
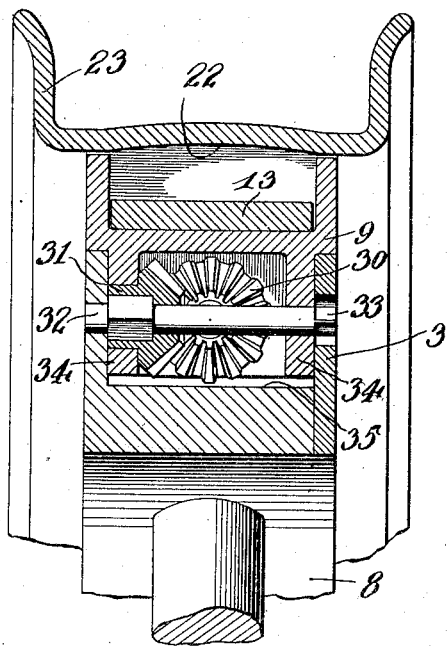
Figure 5:
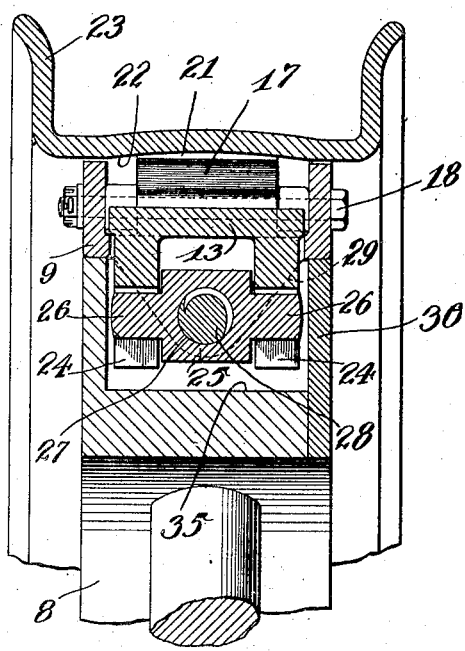
Figure 6:
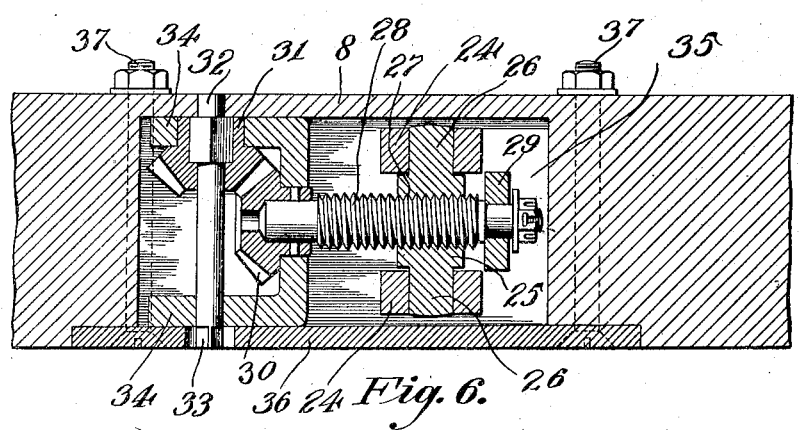

Figure 1 is a central section partly in full through a wheel constructed in accordance with my invention and having a rim applied thereto, Figure 2 an enlarged fragmentary section of the clamping means shown in Figure 1, Figure 3 a view similar to Figure 2 illustrating the parts moved into a clamping position, Figure 4 a section on line 4—4 of Figure 2, Figure 5 a section on line 5—5 of Figure 2, Figure 6 a section on line 6—6 of Figure 2, Figure 7 an enlarged fragmentary perspective view of the clamping block and its associated parts shown in Figure 1, Figure 8 an enlarged fragmentary perspective view of the clamping means for the ring sections, and Figure 9 a fragmentary enlarged central section through the wheel rim shown in Figure 1 showing a modified form of clamping block and wedging faces.

Referring to the drawings, 7 indicates a wheel having a felloe 8. A channel 9 is fitted over the felloe and secured thereto by screws 10 spaced around the channel. Rollers 11 are mounted in the felloe in any suitable manner and project through openings 12 in the channel. A ring 13, made in half sections and mounted in the channel, rides over rollers 11 and is provided with apertures 14 spaced around the ring. The opposite walls 15 and 16 of each aperture are inclined and serve as a securing and a releasing wedging face respectively. Clamping blocks 17 are pivoted to the sides of the channel by bolts 18 or the like. Each clamping block is provided with wedging faces 19 and 20 which are adapted to engage the securing and the releasing wedging faces 15 and 16 respectively. The contour of the outer surface 21 of the blocks conforms to the contour of the inner surface 22 of a demountable rim 23. In the present instance the inner surface 22 of the rim is concaved but it may be of any suitable contour. When the ring is moved in one direction the securing wedging faces 15 will force the clamping blocks against the concaved surface of the rim and securely hold it to the wheel. When the ring is moved in the opposite direction the releasing wedging faces 16 will force the clamping blocks away from the concaved surface of the rim and thus permit its removal from the wheel.

The means for moving the ring comprises lugs 24 depending from the opposite sides of the ring and provided with bifurcated ends. A block 25 carries trunnions 26 which fit between the furcations of each lug. The block 25 has a threaded hole 27 for receiving a screw 28 rotatably mounted in bearing brackets 29 depending from the channel. A bevel gear 30 is fixed to the end of the screw and meshes with a bevel gear 31 fixed to a shaft 32 which has an angular end 33 projecting beyond one of its bearing brackets 34. The angular end is adapted to receive a turning handle of any suitable description for turning the shaft.

The ring moving means fits in a cavity 35 in the felloe of the wheel which is covered by a plate 36 secured to the felloe by screws 37 or the like. The plate is provided with an opening which surrounds the angular end of the shaft to permit the turning handle to be inserted therethrough into engagement with the angular end of the shaft.

In Figure 8, I have shown a modified clamping block 38 which is pivoted at 39 to the channel 40. The ring 41 is provided with a lug 42 which has a releasing wedging face 43 adapted to engage a corresponding face 44 on the clamping block. A lug 45 on the ring is provided with a securing wedging face 46 adapted to engage a corresponding face 47 on the clamping block. In all other respects the construction is similar to that shown in Figures 1 to 7 inclusive. I have therefore given corresponding parts similar reference characters.

When assembling my improved wheel the ring moving means is mounted in the bearing brackets which are fixed to the channel and the channel fitted over the felloe and secured to the felloe by the screws. The rollers are passed through the openings in the channel onto their bearings and the half sections of the ring placed over the rollers and their ends secured together by bolts or the like. Thus the ring is movably mounted within the channel and rides on the rollers. When the ring sections are placed within the channel the depending lugs are disposed to receive the trunnions 26 between the furcations on the ends of the lugs. The clamping blocks 17 are then pivotally connected to the channel by bolts 18 and positioned with their wedging faces in engagement with the wedging faces on the ring. The cover plate is then secured to the felloe to cover the cavity in which the ring moving means is disposed. The wheel is then ready for use.

To use my improved wheel for securing a rim thereto, the rim is placed over the wheel in the usual manner and a turning handle is connected to the angular end of the shaft. By turning the handle a movement is transmitted to the ring through the shaft 32, bevel gears 31 and 30, screw 28, block 25, trunnions 26 and lugs 24. A movement of the ring in one direction will cause the securing wedging faces to force the clamping blocks into engagement with the concaved surface of the rim. This movement causes all the clamping blocks to move simultaneously from the axis of the wheel, thus centralizing the rim relatively thereto.

To remove the rim from the wheel, the handle is turned to move the ring in the opposite direction. The releasing wedging face will force the blocks away from the concaved surface of the rim and permit it to be removed from the wheel.

By providing a wheel as above described it is only necessary to turn one member to secure the rim to or release it from the wheel; the rim will always be centralized relatively to the axis of the wheel, thus insuring smooth running of the vehicle; the clamping blocks will not slide relatively to the rim, therefore no binding action will be placed on the valve stem of the inner tube.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A wheel for demountable rims including a ring movably mounted upon the felloe and having wedging faces; clamping blocks pivotally mounted upon the felloe, engaging the wedging faces and adapted to engage the rim, and means for moving the ring.

2. A wheel for demountable rims including a felloe; a channel fixed to the felloe; a ring movably mounted in the channel and having wedging faces; clamping blocks pivoted on the channel, engaging the wedging faces and adapted to engage the demountable rim, and means for moving the ring.

3. A wheel for demountable rims including a felloe; a channel fixed to the felloe; a sectional ring movably mounted in the channel and having wedging faces; clamping blocks pivoted on the channel, engaging the wedging faces and adapted to engage the demountable rim, and means for moving the ring.

4. A wheel for demountable rims including a felloe; a channel fixed to the felloe; a sectional ring movably mounted in the channel sections and having wedging faces; means for connecting the ends of the ring sections; clamping blocks pivoted on the channel, engaging the wedge faces and adapted to engage the demountable rim, and means for moving the ring.

5. A wheel for demountable rims including a felloe; a channel fixed to the felloe and provided with openings; rollers mounted in the felloe and projecting through the openings; a ring movably mounted on the rollers and having wedging faces; clamping blocks pivoted on the channel, engaging the wedging faces and adapted to engage the demountable rim, and means for moving the ring.

6. A wheel for demountable rims including a felloe; a channel fixed to the felloe; a ring movably mounted in the channel and having openings, the opposite walls of which form securing and releasing wedging faces; clamping blocks pivoted in the channel and having corresponding faces adapted to engage the wedging faces, and means for moving the ring.

7. A wheel for demountable rims including a felloe; a channel fixed to the felloe; a ring movably mounted in the channel and having wedging faces; clamping blocks pivoted to the channel and engaging the wedging faces, each block having its outer face shaped to conform to the inner face of the demountable rim engaged thereby, and means for moving the ring.

8. A wheel for demountable rims including a felloe; a channel fixed to the felloe; a ring movably mounted in the channel and having wedging faces; clamping blocks pivoted to the channel, engaging the wedging faces and adapted to engage the demountable rim; lugs on the ring, and means engaging the lugs for moving the ring.

9. A wheel for demountable rims including a felloe: a channel fixed to the felloe; a ring movably mounted in the channel and having wedging faces; clamping blocks pivoted to the channel, engaging the wedging faces and adapted to engage the demountable rim; lugs on the ring; a block having a threaded hole; trunnions on the block engaging the lugs; a screw rotatably mounted in the felloe and passing through the threaded hole, and means for turning the screw.

10. A wheel for demountable rims including a felloe; a channel fixed to the felloe; a ring movably mounted in the channel and having wedging faces; clamping blocks pivoted to the channel, engaging the wedging faces and adapted to engage the demountable rim; lugs on the ring; a block having a threaded hole; trunnions on the block engaging the lugs; brackets depending form the channel into the felloe; a screw rotatably mounted in the brackets and passing through the threaded hole, and means for rotating the screw.

11. A wheel for demountable rims including a felloe; a channel fixed to the felloe; a ring movably mounted in the channel and having wedging faces; clamping blocks pivoted to the channel, engaging the wedging faces and adapted to engage the demountable rim; lugs on the ring; a block having a threaded hole; trunnions on the block engaging the lugs; brackets depending from the channel into the felloe; a screw rotatably mounted in the brackets and passing through the threaded hole; a shaft mounted in the brackets having an angular end, and means operatively connecting the shaft to the screw.

12. A wheel for demountable rims including a felloe; a channel fixed to the felloe; a ring movably mounted in the channel and having wedging faces; clamping blocks pivoted to the channel, engaging the wedging faces and adapted to engage the demountable rim; lugs on the ring; a block having a threaded hole; trunnions on the block engaging the lugs; brackets depending from the channel into the felloe; a screw rotatably mounted in the brackets and passing through the threaded hole; a shaft mounted in the brackets and having an angular end, and gears operatively connecting the shaft to the screw.

In testimony whereof I have signed my name to this specification in the presence of two subscribing witnesses.

HERMAN RUDOLPH SACK.

Witnesses:
　CHAS. E. POTTS,
　ELIZABETH GARBE.